(12) United States Patent
Yamaguchi

(10) Patent No.: US 10,876,621 B2
(45) Date of Patent: Dec. 29, 2020

(54) POWER TRANSMISSION DEVICE

(71) Applicant: Honda Motor Co., Ltd., Tokyo (JP)

(72) Inventor: Junichi Yamaguchi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 382 days.

(21) Appl. No.: 15/921,668

(22) Filed: Mar. 15, 2018

(65) Prior Publication Data
US 2018/0274655 A1    Sep. 27, 2018

(30) Foreign Application Priority Data

Mar. 22, 2017 (JP) ................................. 2017-055625

(51) Int. Cl.
*F16H 57/04* (2010.01)
*F16H 3/66* (2006.01)

(52) U.S. Cl.
CPC ....... *F16H 57/043* (2013.01); *F16H 57/0426* (2013.01); *F16H 57/0471* (2013.01); *F16H 57/0484* (2013.01); *F16H 3/66* (2013.01); *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01)

(58) Field of Classification Search
CPC . F16H 57/043; F16H 57/0426; F16H 57/0471
USPC ........................................................ 184/6.12
See application file for complete search history.

(56) References Cited

U.S. PATENT DOCUMENTS

| | | | | |
|---|---|---|---|---|
| 2006/0054409 | A1* | 3/2006 | Miyazaki | F16H 57/0421 184/6.12 |
| 2007/0111839 | A1* | 5/2007 | Choi | F16H 57/0482 475/159 |
| 2014/0213405 | A1* | 7/2014 | Ishikawa | F16H 57/043 475/160 |
| 2015/0252945 | A1* | 9/2015 | Rippelmeyer | F16N 27/005 475/160 |

(Continued)

FOREIGN PATENT DOCUMENTS

| | | |
|---|---|---|
| CN | 102168749 | 8/2011 |
| CN | 103225694 | 7/2013 |
| JP | S5142861 | 4/1976 |

(Continued)

OTHER PUBLICATIONS

"Office Action of China Counterpart Application," with machine English translation thereof, dated Jan. 6, 2020, p. 1-p. 10.

(Continued)

*Primary Examiner* — Michael R Mansen
*Assistant Examiner* — Mark K Buse
(74) *Attorney, Agent, or Firm* — JCIPRNET

(57) ABSTRACT

A power transmission device is provided. A rotary shaft is provided in a housing via a bearing. A lubricant passage that is opened at an end is formed in the rotary shaft. A discharge channel that discharges the lubricant in the lubricant passage in a radial direction from an opening at the end of the rotary shaft and supplies the lubricant to the bearing is provided. An annular protruding portion is provided in the discharge channel. The annular protruding portion is formed on an inner surface of the housing facing an axial direction of the rotary shaft and protrudes to between the rotary shaft and the bearing.

3 Claims, 9 Drawing Sheets

(56) References Cited

U.S. PATENT DOCUMENTS

2015/0337945 A1* 11/2015 McKinzie ............ F16H 57/023
403/34

FOREIGN PATENT DOCUMENTS

| | | |
|---|---|---|
| JP | S58157060 | 10/1983 |
| JP | S616065 | 1/1986 |
| JP | 2000240772 | 9/2000 |
| JP | 2003049910 | 2/2003 |
| JP | 2005054874 | 3/2005 |
| KR | 1519380 | 5/2015 |

OTHER PUBLICATIONS

"Office Action of Japan Counterpart Application," with English translation thereof, dated Jul. 24, 2018, p. 1-p. 5.
"Office Action of China Counterpart Application", dated Jul. 27, 2020, with English translation thereof, pp. 1-11.

* cited by examiner

| | C1 | C2 | C3 | B1 | B2 | B3 | F1 | GEAR SHIFT RATIO | COMMON RATIO |
|---|---|---|---|---|---|---|---|---|---|
| Rvs | | | ○ | | ○ | | L | 4.008 | |
| 1st | | | | ○ | (○) | | R/L | 5.233 | |
| 2nd | | ○ | | ○ | ○ | | R | 3.367 | 1.554 |
| 3rd | | | ○ | ○ | ○ | | R | 2.298 | 1.465 |
| 4th | | ○ | ○ | ○ | | | R | 1.705 | 1.348 |
| 5th | ○ | | (○) | ○ | | | R | 1.363 | 1.251 |
| 6th | ○ | ○ | ○ | | | | R | 1.000 | 1.363 |
| 7th | ○ | | ○ | | ○ | | R | 0.786 | 1.273 |
| 8th | ○ | ○ | | | ○ | | R | 0.657 | 1.196 |
| 9th | ○ | | | | ○ | ○ | R | 0.584 | 1.126 |
| 10th | ○ | ○ | | | | ○ | R | 0.520 | 1.120 |

POWER TRANSMISSION DEVICE

CROSS-REFERENCE TO RELATED APPLICATION

This application claims the priority of Japan patent application serial no. 2017-055625, filed on Mar. 22, 2017. The entirety of the above-mentioned patent application is hereby incorporated by reference herein and made a part of this specification.

BACKGROUND

Technical Field

The disclosure relates to a power transmission device, and more particularly, to a structure for lubricating a bearing which is disposed on an outer circumferential surface side of a rotary shaft for transmission of power.

Description of Related Art

In a power transmission device such as a transmission, a lubricant is supplied to a bearing which is disposed on an outer circumferential surface of a rotary shaft. The supply of a lubricant is performed via a lubricant passage which is formed inside the rotary shaft. The lubricant passage extends in an axial direction inside the rotary shaft and a lubricant is supplied from one end of the lubricant passage. A discharge channel that is opened to the outer circumferential surface is formed in the rotary shaft, and the lubricant supplied to the lubricant passage flows to the bearing via the discharge channel with rotation of the rotary shaft.

However, a lubricant supplied to the lubricant passage is discharged to the outside of the rotary shaft when the lubricant reaches the other end of the lubricant passage due to an influence of a centrifugal force of the rotating rotary shaft. Accordingly, for example, there is concern that a bearing rotatably supporting the rotary shaft at the other end of the rotary shaft will not be sufficiently lubricated.

Therefore, in the related art, a lubricant supply structure in which a lubricant is guided to a desired position in the lubricant passage via a tube member by providing the tube member extending over the whole length in the lubricant passage of the rotary shaft and forming a communication hole communicating with the lubricant passage on an outer circumferential surface of the tube member is known (for example, see Patent Document 1).

The tube member is fixed to a housing that rotatably supports the rotary shaft. Since a lubricant in the tube member is not affected by a centrifugal force based on rotation of the rotary shaft, a sufficient amount of lubricant is supplied from one end of the tube member to the other end. Accordingly, a sufficient amount of lubricant can be supplied to the bearing that rotatably supports the rotary shaft at the other end of the rotary shaft.

PATENT DOCUMENTS

[Patent Document 1] Japanese Patent Application Laid-Open No. 2000-240772

SUMMARY

An exemplary embodiment of the disclosure provides a power transmission device including: a rotary shaft (for example, an idling shaft 23 in an embodiment, which is the same in the following description) that is provided in a housing (for example, a transmission case 10 in the embodiment, which is the same in the following description); a lubricant passage (for example, a lubricant passage 231 in the embodiment, which is the same in the following description) that is formed in the rotary shaft and is opened at an end of the rotary shaft; a bearing (for example, a first bearing BRG1 in the embodiment, which is the same in the following description) that is provided between an outer circumference of an end of the rotary shaft and the housing and rotatably supports the rotary shaft; and a discharge channel (for example, a discharge space 233 in the embodiment, which is the same in the following description) that discharges a lubricant in the lubricant passage in a radial direction from the opening at the end of the rotary shaft to supply the lubricant to the bearing, wherein the discharge channel includes a first annular protruding portion (for example, a first annular protruding portion 233a in the embodiment, which is the same in the following description) that is formed on an inner surface of the housing facing an axial direction of the rotary shaft and protrudes between the rotary shaft and the bearing.

In an exemplary embodiment of the disclosure, the discharge channel may include a second annular protruding portion (for example, a second annular protruding portion 233b in the embodiment, which is the same in the following description) that is formed on the inner surface of the housing facing the axial direction of the rotary shaft and protrudes to an inner circumferential edge of the opening of the rotary shaft.

In an exemplary embodiment of the disclosure, the opening of the rotary shaft may include an inclined surface (for example, an inclined guide surface 231b in the embodiment, which is the same in the following description) that expands gradually from the inside of the lubricant passage to the outside of the opening.

DESCRIPTION OF THE EMBODIMENTS

However, in a conventional power transmission device, the bearing supporting the rotary shaft is provided on the outer circumference of an end position of the rotary shaft and has a smaller protruding length outward from the end face in the axial direction of the rotary shaft. Since a lubricant discharged outward from an edge of the lubricant passage due to the centrifugal force resulting from rotation of the rotary shaft strongly flows in a direction perpendicular to an axis of the rotary shaft, the lubricant flows outward past the bearing with almost no contact with the bearing. Accordingly, even when a sufficient amount of lubricant is supplied from the edge of the lubricant passage, there is concern that lubrication of the bearing will not be satisfactory.

An aspect of the disclosure is to provide a power transmission device that can satisfactorily supply a lubricant from a lubricant passage which is formed in a rotary shaft.

According to an exemplary embodiment of the disclosure, by providing the first annular protruding portion on the inner surface of the housing, a lubricant flowing from the end of the lubricant passage into the discharge channel is guided over the first annular protruding portion. Since the first annular protruding portion protrudes between the rotary shaft and the bearing, the lubricant guided to the first annular protruding portion flows to the bearing. Accordingly, it is possible to satisfactorily supply the lubricant past the lubricant passage of the rotary shaft to the bearing.

According to an exemplary embodiment of the disclosure, by providing a second annular protruding portion in the inner surface of the housing, the lubricant flowing along the inner surface of the lubricant passage and colliding linearly with the inner surface of the housing is smoothly changed in direction to a radial direction by a second annular protruding portion. Accordingly, the lubricant flowing along the inner surface of the lubricant passage can be smoothly curved in the radial direction to flow to a discharge space.

According to an exemplary embodiment of the disclosure, when the inclined surface is provided at the end of the lubricant passage, the lubricant flows along the inclined surface to form a flow in the radial direction due to the centrifugal force of the rotary shaft. Accordingly, it is possible to cause the lubricant flowing along the inner surface of the lubricant passage to flow to the discharge space.

Figure 1:
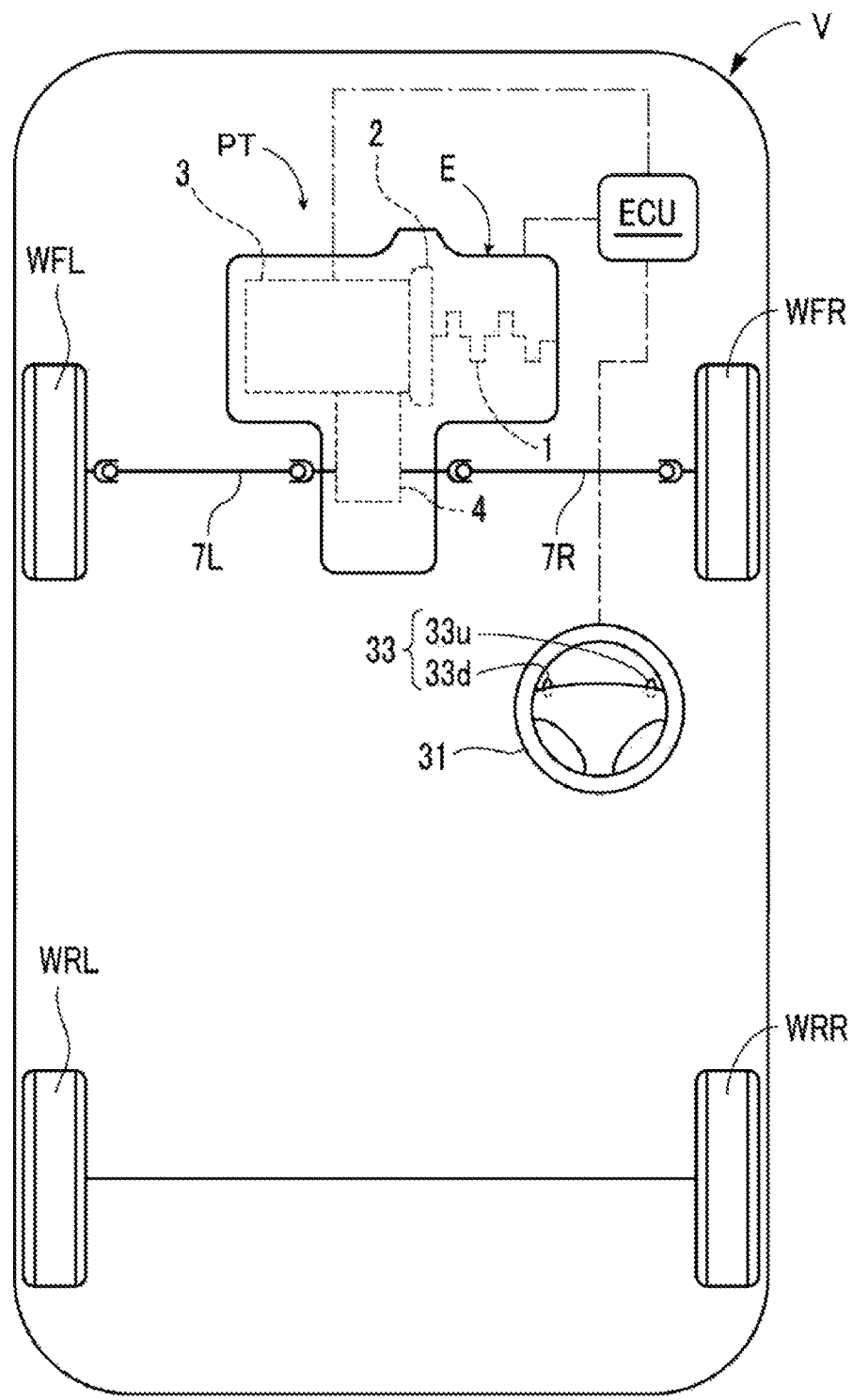
FIG. 1 is a diagram schematically illustrating a vehicle in which a power transmission device according to an embodiment of the disclosure is mounted.

An embodiment of the disclosure will be described below with reference to the accompanying drawings. As illustrated in FIG. 1, a vehicle V includes a power transmission device PT according to the embodiment and an engine E (an internal combustion engine as a drive source, where an electric motor may be used instead of the engine E) in which a crank shaft 1 is horizontally arranged to be parallel to a right-left direction of a vehicle body).

A driving force output from the engine E is transmitted to the power transmission device PT. The power transmission device PT adjusts the driving force of the engine E to correspond to a selected gear shift ratio and transmits the adjusted driving force to front-right and front-left wheels WFL and WFR.

The power transmission device PT includes a torque converter 2 that is connected to the crank shaft 1, an automatic transmission 3 that is connected to the torque converter 2, and a front differential gear 4 that is connected to the automatic transmission 3. The power transmission device PT having this configuration is controlled by a gear shift controller ECU.

The front differential gear 4 is connected to the front-right and front-left wheels WFL and WFR via a front-left axle 7L and a front-right axle 7R.

Figure 2:
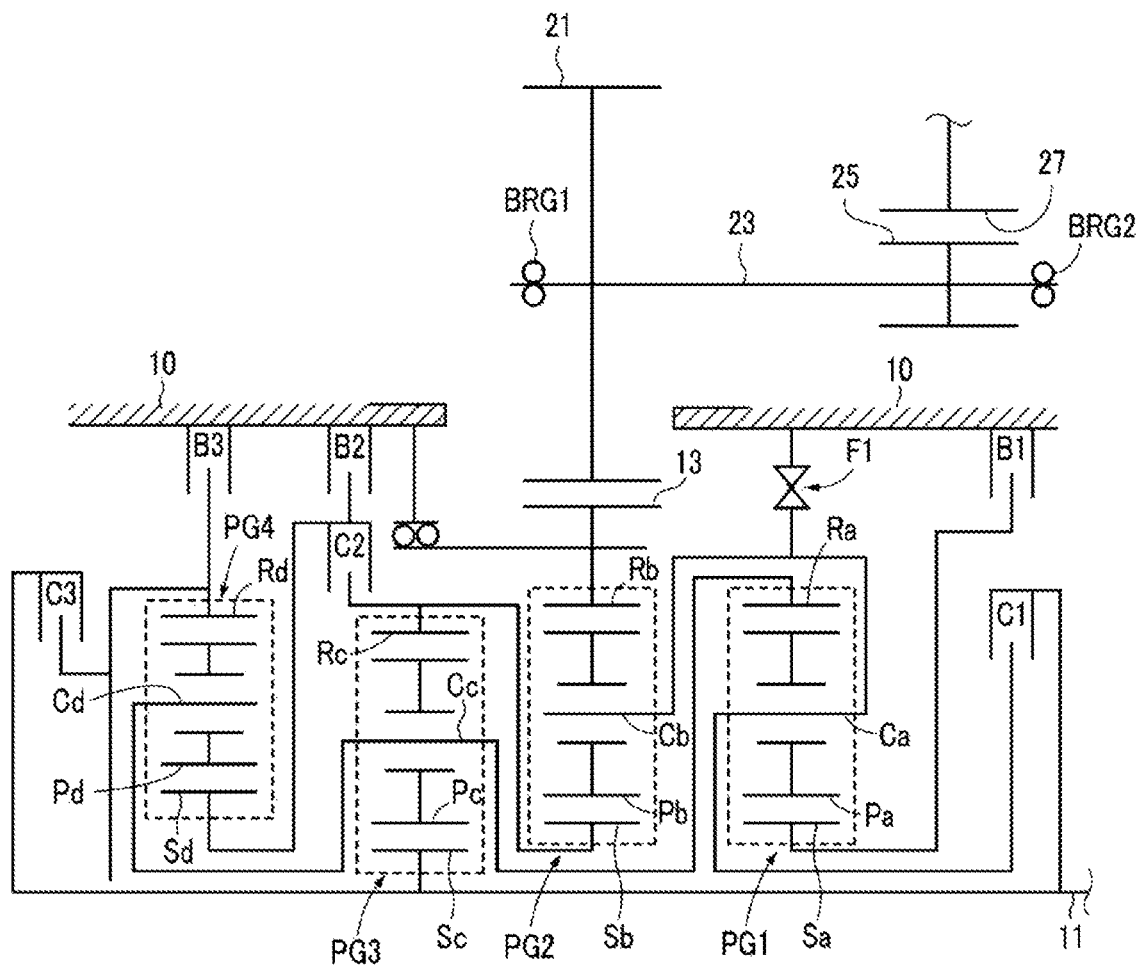
FIG. 2 is a skeleton diagram illustrating a gear shift mechanism which is the power transmission device according to the embodiment.

FIG. 2 is a skeleton diagram of the automatic transmission 3. The automatic transmission 3 includes an input shaft 11 serving as an input member which is rotatably supported in a transmission case 10 serving as a housing and an output member 13 including an output gear disposed to be concentric with the input shaft 11. A driving force from the engine E is transmitted to the input shaft 11 via the torque converter 2 including a lockup clutch and a damper.

Rotation of the output member 13 is transmitted to right and left driving wheels (front wheels WFR and WFL) of the vehicle via an idling gear 21 that engages with the output member 13, an idling shaft 23 corresponding to a rotary shaft in the embodiment of the disclosure and axially supporting the idling gear 21, a final drive gear 25 that is axially supported by the idling shaft 23, and a front differential gear 4 including a final driven gear 27 that engages with the final drive gear 25.

A single-disc type or multi-disc type starting clutch configured to frictionally engage may be provided instead of the torque converter 2. A propeller shaft may be provided instead of the front differential gear 4 for application to a rear-wheel-drive vehicle. A propeller shaft may be connected to the front differential gear 4 via a transfer for application to a four-wheel-drive vehicle.

In the transmission case 10, four planetary gear mechanisms of first to fourth planetary gear mechanisms PG1 to PG4 are arranged to be concentric with the input shaft 11 sequentially from the engine E side. The third planetary gear mechanism PG3 is configured as a so-called single pinion type planetary gear mechanism including a sun gear Sc, a ring gear Rc, and a carrier Cc that axially supports a pinion Pc engaging with the sun gear Sc and the ring gear Rc in a rotatable and revolvable manner.

The so-called single pinion type planetary gear mechanism is also referred to as a minus planetary gear mechanism or a negative planetary gear mechanism, because, when the carrier is fixed and the sun gear is rotated, the ring gear rotates in a direction different from the rotating direction of the sun gear. In the so-called single pinion type planetary gear mechanism, when the ring gear is fixed and the sun gear is rotated, the carrier rotates in the same direction as the sun gear.

Figure 3:
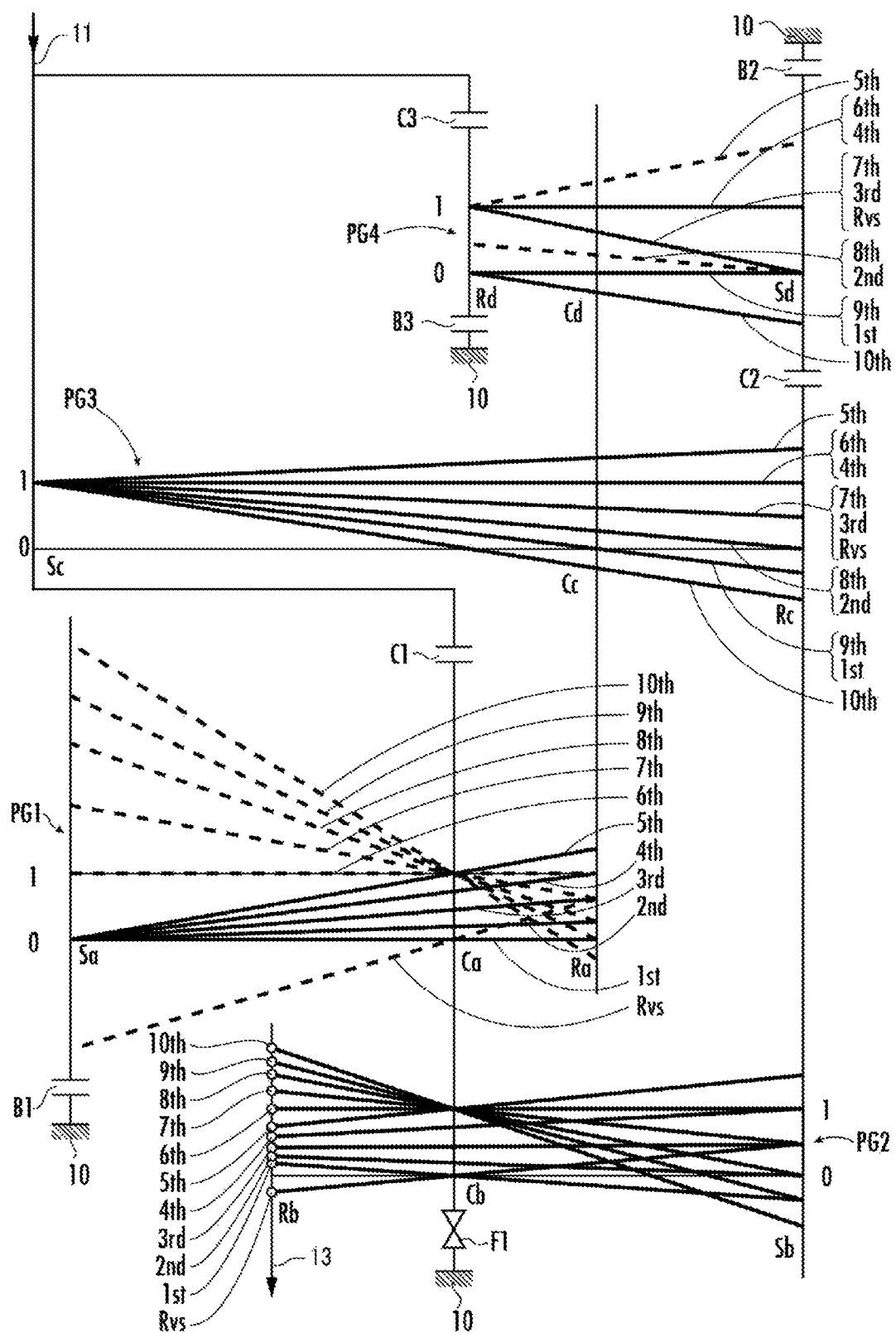
FIG. 3 is a nomogram illustrating the gear shift mechanism which is the power transmission device according to the embodiment.

Referring to the nomogram (a diagram in which ratios of relative rotation speeds of three elements of the sun gear, the carrier, and the ring gear are expressed as straight lines (speed lines)) of the third planetary gear mechanism PG3 illustrated in the second stage from the top of FIG. 3, when three elements Sc, Cc, and Rc of the third planetary gear mechanism PG3 are a first element, a second element, and a third element from the left in an arrangement order at intervals corresponding to a gear ratio (the number of teeth of the ring gear/the number of teeth of the sun gear) in the nomogram, the first element is the sun gear Sc, the second element is the carrier Cc, and the third element is the ring gear Re.

Here, a ratio of the interval between the sun gear Sc and the carrier Cc and the interval between the carrier Cc and the ring gear Rc is set to h:1, where h denotes a gear ratio of the third planetary gear mechanism PG3. In the nomogram, a lower horizontal line and an upper horizontal line (a line in which the $4^{th}$ line and the $6^{th}$ line are superimposed on each other) denote that the rotation speeds thereof are "0" and "1" (the same rotation speed as the input shaft 11), respectively.

The fourth planetary gear mechanism PG4 is configured as a so-called single pinion type planetary gear mechanism including a sun gear Sd, a ring gear Rd, and a carrier Cd that axially supports a pinion Pd engaging with the sun gear Sd and the ring gear Rd in a rotatable and revolvable manner.

Referring to the nomogram of the fourth planetary gear mechanism PG4 illustrated in the first stage (an uppermost stage) from the top of FIG. 3, when three elements Sd, Cd, and Rd of the fourth planetary gear mechanism PG4 are a fourth element, a fifth element, and a sixth element from the left in an arrangement order at intervals corresponding to a gear ratio in the nomogram, the fourth element is the ring gear Rd, the fifth element is the carrier Cd, and the sixth element is the sun gear Sd. A ratio of the interval between the sun gear Sd and the carrier Cd and the interval between the carrier Cd and the ring gear Rd is set to i:1, where i denotes the gear ratio of the fourth planetary gear mechanism PG4.

The first planetary gear mechanism PG1 is configured as a so-called single pinion type planetary gear mechanism including a sun gear Sa, a ring gear Ra, and a carrier Ca that axially supports a pinion Pa engaging with the sun gear Sa and the ring gear Ra in a rotatable and revolvable manner.

Referring to the nomogram of the first planetary gear mechanism PG1 illustrated in the third stage from the top of FIG. 3, when three elements Sa, Ca, and Ra of the first planetary gear mechanism PG1 are a seventh element, an eighth element, and a ninth element from the left in an arrangement order at intervals corresponding to a gear ratio in the nomogram, the seventh element is the sun gear Sa, the eighth element is the carrier Ca, and the ninth element is the ring gear Ra. A ratio of the interval between the sun gear Sa and the carrier Ca and the interval between the carrier Ca and the ring gear Ra is set to j:1, where j denotes the gear ratio of the first planetary gear mechanism PG1.

The second planetary gear mechanism PG2 is configured as a so-called single pinion type planetary gear mechanism including a sun gear Sb, a ring gear Rb, and a carrier Cb that axially supports a pinion Pb engaging with the sun gear Sb and the ring gear Rb in a rotatable and revolvable manner.

Referring to the nomogram of the second planetary gear mechanism PG2 illustrated in the fourth stage (a lowermost stage) from the top of FIG. 3, when three elements Sb, Cb, and Rb of the second planetary gear mechanism PG2 are a tenth element, an eleventh element, and a twelfth element from the left in an arrangement order at intervals corresponding to a gear ratio in the nomogram, the tenth element is the ring gear Rb, the eleventh element is the carrier Cb, and the twelfth element is the sun gear Sb. A ratio of the interval between the sun gear Sb and the carrier Cb and the interval between the carrier Cb and the ring gear Rb is set to k:1, where k denotes the gear ratio of the second planetary gear mechanism PG2.

The sun gear Sc (the first element) of the third planetary gear mechanism PG3 is connected to the input shaft 11 (a second input shaft 11b which will be described later). The ring gear Rb (the tenth element) of the second planetary gear mechanism PG2 is connected to the output member 13 including an output gear.

The carrier Cc (the second element) of the third planetary gear mechanism PG3, the carrier Cd (the fifth element) of the fourth planetary gear mechanism PG4, and the ring gear Ra (the ninth element) of the first planetary gear mechanism PG1 are connected to form a first connected structure Cc-Cd-Ra. The ring gear Rc (the third element) of the third planetary gear mechanism PG3 and the sun gear Sb (the twelfth element) of the second planetary gear mechanism PG2 are connected to form a second connected structure Rc-Sb. The carrier Ca (the eighth element) of the first planetary gear mechanism PG1 and the carrier Cb (the eleventh element) of the second planetary gear mechanism PG2 are connected to form a third connected structure Ca-Cb.

The automatic transmission according to this embodiment includes seven engagement mechanisms including three clutches, that is, first to third clutches C1 to C3, three brakes, that is, first to third brakes B1 to B3, and one two-way clutch F1.

The first clutch C1 is a hydraulically actuated type wet multi-disc clutch and is configured to be switchable between a connected state in which the sun gear Sc (the first element) of the third planetary gear mechanism PG3 is connected to the third connected structure Ca-Cb and a disconnected state (open state) in which the connection is cut. An input side of the first clutch C1 is connected to the input shaft 11 (a first input shaft 11a which will be described later).

The third clutch C3 is a hydraulically actuated type wet multi-disc clutch and is configured to be switchable between a connected state in which the sun gear Sc (the first element) of the third planetary gear mechanism PG3 is connected to the ring gear Rd (the fourth element) of the fourth planetary gear mechanism PG4 and a disconnected state in which the connection is cut.

The second clutch C2 is a hydraulically actuated type wet multi-disc clutch and is configured to be switchable between a connected state in which the sun gear Sd (the sixth element) of the fourth planetary gear mechanism PG4 is connected to the second connected structure Rc-Sb and a disconnected state in which the connection is cut.

The two-way clutch F1 also has a function of a fourth brake and is configured to be switchable between a reverse rotation prohibited state in which forward rotation (rotation in the same direction as the rotating direction of the input shaft 11 and the output member 13) of the third connected structure Ca-Cb is permitted and reverse rotation thereof is prohibited and a fixed state in which the third connected structure Ca-Cb is fixed to the transmission case 10.

In the reverse rotation prohibited state, when a force for rotating in the forward rotating direction is applied to the third connected structure Ca-Cb, the rotation is permitted and the two-way clutch F1 is switched to the disconnected state. When a force for rotating in the reverse rotating direction is applied thereto, the rotation is prohibited and the two-way clutch F1 is switched to the fixed state in which the third connected structure is fixed to the transmission case 10. In this embodiment, the two-way clutch F1 corresponds to a switching mechanism.

The first brake B1 is a hydraulically actuated type wet multi-disc brake and is configured to be switchable between a fixed state in which the sun gear Sa (the seventh element) of the first planetary gear mechanism PG1 is fixed to the transmission case 10 and a disconnected state in which the fixation is released.

The second brake B2 is a hydraulically actuated type wet multi-disc brake and is configured to be switchable between a fixed state in which the sun gear Sd (the sixth element) of the fourth planetary gear mechanism PG4 is fixed to the transmission case 10 and a disconnected state in which the fixation is released. The third brake B3 is a hydraulically actuated type wet multi-disc brake and is configured to be switchable between a fixed state in which the ring gear Rd (the fourth element) of the fourth planetary gear mechanism PG4 is fixed to the transmission case 10 and a disconnected state in which the fixation is released.

The states of the clutches C1 to C3, the brakes B1 to B3, and the two-way clutch F1 are switched on the basis of vehicle information such as a traveling speed of the vehicle by the gear shift controller ECU including a transmission control unit (TCU) illustrated in FIG. 1.

The gear shift controller ECU is configured as an electronic control unit including a CPU and a memory which are not illustrated, can receive predetermined vehicle information such as a traveling speed or an accelerator opening degree of the vehicle V, a rotation speed or an output torque of the engine E, or operation information of a paddle shift lever 33, and controls the automatic transmission 3 (a gear shift mechanism) by causing the CPU to execute a control program stored in a storage device such as the memory.

As illustrated in FIG. 1, the paddle shift lever 33 is provided in a steering wheel 31 of the vehicle V according to this embodiment, the gear stage is upshifted manually by pulling a right paddle 33$u$ forward, and the gear stage is downshifted manually by pulling a left paddle 33$d$ forward. An operation signal of the paddle shift lever 33 is transmitted to the gear shift controller ECU.

An operation unit for manual operation in the disclosure is not limited to the paddle shift lever 33 according to the embodiment, but another operation unit such as a shift lever disposed between a driver seat and a passenger seat or a button disposed in a steering wheel may be used.

As illustrated in FIG. 2, on an axis of the input shaft 11, the first clutch C1, the first planetary gear mechanism PG1, the second planetary gear mechanism PG2, the third planetary gear mechanism PG3, the second clutch C2, the fourth planetary gear mechanism PG4, and the third clutch C3 are sequentially arranged from the engine E and the torque converter 2 side.

The third brake B3 is disposed outside in the radial direction of the fourth planetary gear mechanism PG4, the second brake B2 is disposed outside in the radial direction of the second clutch C2, the first brake B1 is disposed outside in the radial direction of the first clutch C1, and the two-way clutch F1 is disposed outside in the radial direction of the first planetary gear mechanism PG1.

In this way, by disposing the three brakes B1 to B3 and the two-way clutch F1 outside in the radial direction of the planetary gear mechanisms or the clutches, it is possible to achieve a decrease in axial length of the automatic transmission 3 in comparison with a case in which the brakes B1 to B3 and the two-way clutch F1 along with the planetary gear mechanisms and the clutches are arranged on the axis of the input shaft 11. The third brake B3 may be disposed outside in the radial direction of the third clutch C3 and the second brake B2 may be disposed outside in the radial direction of the fourth planetary gear mechanism PG4.

Cases in which gear stages of the automatic transmission 3 according to the embodiment are set up will be described below with reference to FIGS. 3 and 4.

When a first gear stage is set up, the two-way clutch F1 is set to the reverse rotation prohibited state (R in FIG. 4) and the first brake B1 and the second brake B2 are set to the fixed state. By setting the two-way clutch F1 to the reverse rotation prohibited state (R) and setting the first brake B1 to the fixed state, reverse rotation of the third connected structure Ca-Cb and the sun gear Sa (the seventh element) of the first planetary gear mechanism PG1 is prohibited and the rotation speed of the third connected structure Ca-Cb and the sun gear Sa (the seventh element) of the first planetary gear mechanism PG1 is "0."

Accordingly, three elements of the seventh to ninth elements Sa, Ca, and Ra of the first planetary gear mechanism PG1 are in a locked state in which relative rotation is not possible, and the rotation speed of the first connected structure Cc-Cd-Ra including the ring gear Ra (the ninth element) of the first planetary gear mechanism PG1 is "0." The rotation speed of the ring gear Rb (the tenth element) of the second planetary gear mechanism PG2 which is connected to the output member 13 is "1st" which is illustrated in FIG. 3 and the first gear stage is set up.

In order to set up the first gear stage, it is not necessary to set the second brake B2 to the fixed state, however, the second brake B2 is set to the fixed state at the first gear stage such that smooth shift from the first gear stage to a second gear stage which will be described later is achieved. When an engine brake is used at the first gear stage, the two-way clutch F1 can be switched from the reverse rotation prohibited state (R) to the fixed state (L).

When a second gear stage is set up, the two-way clutch F1 is set to the reverse rotation prohibited state (R), the first brake B1 and the second brake B2 are set to the fixed state, and the second clutch C2 is set to the connected state. By setting the two-way clutch F1 to the reverse rotation prohibited state (R), forward rotation of the third connected structure Ca-Cb is permitted. By setting the first brake B1 to the fixed state, the rotation speed of the sun gear Sa (the seventh element) of the first planetary gear mechanism PG1 is "0." By setting the second brake B2 to the fixed state, the rotation speed of the sun gear Sd (the sixth element) of the fourth planetary gear mechanism PG4 is "0."

By setting the second clutch C2 to the connected state, the rotation speed of the second connected structure Rc-Sb is "0" which is the same as the rotation speed of the sun gear Sd (the sixth element) of the fourth planetary gear mechanism PG4. The rotation speed of the ring gear Rb (the tenth element) of the second planetary gear mechanism PG2 which is connected to the output member 13 is "2nd" which is illustrated in FIG. 3 and the second gear stage is set up.

When a third gear stage is set up, the two-way clutch F1 is set to the reverse rotation prohibited state, the first brake B1 and the second brake B2 are set to the fixed state, and the third clutch C3 is set to the connected state. By setting the two-way clutch F1 to the reverse rotation prohibited state, forward rotation of the third connected structure Ca-Cb is permitted. By setting the first brake B1 to the fixed state, the rotation speed of the sun gear Sa (the seventh element) of the first planetary gear mechanism PG1 is "0." By setting the second brake B2 to the fixed state, the rotation speed of the sun gear Sd (the sixth element) of the fourth planetary gear mechanism PG4 is "0."

By setting the third clutch C3 to the connected state, the rotation speed of the ring gear Rd (the fourth element) of the fourth planetary gear mechanism PG4 is "1" which is the same as the rotation speed of the sun gear Sc (the first element) of the third planetary gear mechanism PG3 which is connected to the input shaft 11. Since the rotation speed of the sun gear Sd (the sixth element) of the fourth planetary gear mechanism PG4 is "0" and the rotation speed of the ring gear Rd (the fourth element) is "1," the rotation speed of the carrier Cd (the fifth element), that is, the rotation speed of the first connected structure Cc-Cd-Ra, is i/(i+1).

The rotation speed of the ring gear Rb (the tenth element) of the second planetary gear mechanism PG2 which is connected to the output member 13 is "3rd" which is illustrated in FIG. 3 and the third gear stage is set up.

When a fourth gear stage is set up, the two-way clutch F1 is set to the reverse rotation prohibited state, the first brake B1 is set to the fixed state, and the second clutch C2 and the third clutch C3 are set to the connected state. By setting the two-way clutch F1 to the reverse rotation prohibited state, forward rotation of the third connected structure Ca-Cb is permitted. By setting the first brake B1 to the fixed state, the rotation speed of the sun gear Sa (the seventh element) of the first planetary gear mechanism PG1 is "0."

By setting the second clutch C2 to the connected state, the sun gear Sd (the sixth element) of the fourth planetary gear mechanism PG4 and the second connected structure Rc-Sb rotate at the same speed. Accordingly, in the third planetary gear mechanism PG3 and the fourth planetary gear mechanism PG4, the carrier Cc (the second element) and the carrier Cd (the fifth element) are connected, and the ring gear Rc (the third element) and the sun gear Sd (the sixth element) are connected. At the fourth gear stage at which the second clutch C2 is set to the connected state, one nomogram including four elements can be drawn with the third planetary gear mechanism PG3 and the fourth planetary gear mechanism PG4.

By setting the third clutch C3 to the connected state, the rotation speed of the ring gear Rd (the fourth element) of the fourth planetary gear mechanism PG4 is "1" which is the same as the rotation speed of the sun gear Sc (the first element) of the third planetary gear mechanism PG3, and the rotation speeds of two elements among four elements in the third planetary gear mechanism PG3 and the fourth planetary gear mechanism PG4 are "1" which is the same speed.

Accordingly, the elements of the third planetary gear mechanism PG3 and the fourth planetary gear mechanism PG4 are in the locked state in which relative rotation is not possible, and the rotation speed of all the elements of the third planetary gear mechanism PG3 and the fourth planetary gear mechanism PG4 is "1." The rotation speed of the third connected structure Ca-Cb is $j/(j+1)$, and the rotation speed of the ring gear Rb (the tenth element) of the second planetary gear mechanism PG2 which is connected to the output member 13 is "4th" which is illustrated in FIG. 3 and the fourth gear stage is set up.

When a fifth gear stage is set up, the two-way clutch F1 is set to the reverse rotation prohibited state, the first brake B1 is set to the fixed state, and the first clutch C1 and the third clutch C3 are set to the connected state. By setting the two-way clutch F1 to the reverse rotation prohibited state, forward rotation of the third connected structure Ca-Cb is permitted. By setting the first brake B1 to the fixed state, the rotation speed of the sun gear Sa (the seventh element) of the first planetary gear mechanism PG1 is "0."

By setting the first clutch C1 to the connected state, the rotation speed of the third connected structure Ca-Cb is "1" which is the same as the rotation speed of the sun gear Sc (the first element) of the third planetary gear mechanism PG3. The rotation speed of the ring gear Rb (the tenth element) of the second planetary gear mechanism PG2 which is connected to the output member 13 is "5th" which is illustrated in FIG. 3 and the fifth gear stage is set up.

In order to set up the fifth gear stage, it is not necessary to set the third clutch C3 to the connected state. However, since the third clutch needs to be set to the connected state at the fourth gear stage and a sixth gear stage which will be described later, the third clutch C3 is set to the connected state at the fifth gear stage such that smooth downshift from the fifth gear stage to the fourth gear stage and upshift from the fifth gear stage to the sixth gear stage which will be described later are achieved.

When the sixth gear stage is set up, the two-way clutch F1 is set to the reverse rotation prohibited state, and three clutches of the first to third clutches C1 to C3 are set to the connected state. By setting the two-way clutch F1 to the reverse rotation prohibited state, forward rotation of the third connected structure Ca-Cb is permitted.

By setting the second clutch C2 and the third clutch C3 to the connected state, the elements of the third planetary gear mechanism PG3 and the fourth planetary gear mechanism PG4 become the state in which relative rotation is not possible as described at the fourth gear stage, and the rotation speed of the second connected structure Rc-Sb is "1." By setting the first clutch C1 to the connected state, the rotation speed of the third connected structure Ca-Cb is "1."

Accordingly, the carrier Cb (the eleventh element) and the sun gear Sb (the twelfth element) of the second planetary gear mechanism PG2 have the same rotation speed "1," and the elements are in the locked state in which relative rotation is not possible. The rotation speed of the ring gear Rb (the tenth element) of the second planetary gear mechanism PG2 which is connected to the output member 13 is "1" of the "6th" which is illustrated in FIG. 3 and the sixth, gear stage is set up.

When a seventh gear stage is set up, the two-way clutch F1 is set to the reverse rotation prohibited state, the second brake B2 is set to the fixed state, and the first clutch C1 and the third clutch C3 are set to the connected state. By setting the two-way clutch F1 to the reverse rotation prohibited state, forward rotation of the third connected structure Ca-Cb is permitted.

By setting the second brake B2 to the fixed state, the rotation speed of the sun gear Sd (the sixth element) of the fourth planetary gear mechanism PG4 is "0." By setting the third clutch C3 to the connected state, the rotation speed of the ring gear Rd (the fourth element) of the fourth planetary gear mechanism PG4 is "1" which is the same as the rotation speed of the sun gear Sc (the first element) of the third planetary gear mechanism PG3, and the rotation speeds of the first connected structure Cc-Cd-Ra including the carrier Cd (the fifth element) of the fourth planetary gear mechanism PG4 is $i/(i+1)$.

By setting the first clutch C1 to the connected state, the rotation speed of the third connected structure Ca-Cb is "1" which is the same as the rotation speed of the sun gear Sc (the first element) of the third planetary gear mechanism PG3 connected to the input shaft 11. The rotation speed of the ring gear Rb (the tenth element) of the second planetary gear mechanism PG2 which is connected to the output member 13 is "7th" which is illustrated in FIG. 3 and the seventh gear stage is set up.

When an eighth gear stage is set up, the two-way clutch F1 is set to the reverse rotation prohibited state, the second brake B2 is set to the fixed state, and the first clutch C1 and the second clutch C2 are set to the connected state. By setting the two-way clutch F1 to the reverse rotation prohibited state, forward rotation of the third connected structure Ca-Cb is permitted.

By setting the second brake B2 to the fixed state, the rotation speed of the sun gear Sd (the sixth element) of the fourth planetary gear mechanism PG4 is "0." By setting the second clutch C2 to the connected state, the rotation speed of the second connected structure Rc-Sb is "0" which is the same as the rotation speed of the sun gear Sd (the sixth element) of the fourth planetary gear mechanism PG4.

By setting the first clutch C1 to the connected state, the rotation speed of the third connected structure Ca-Cb is "1" which is the same as the rotation speed of the sun gear Sc (the first element) of the third planetary gear mechanism PG3. The rotation speed of the ring gear Rb (the tenth element) of the second planetary gear mechanism PG2 which is connected to the output member 13 is "8th" which is illustrated in FIG. 3 and the eighth gear stage is set up.

When a ninth gear stage is set up, the two-way clutch F1 is set to the reverse rotation prohibited state, the second brake B2 and the third brake B3 are set to the fixed state, and the first clutch C1 is set to the connected state. By setting the two-way clutch F1 to the reverse rotation prohibited state, forward rotation of the third connected structure Ca-Cb is permitted.

By setting the second brake B2 to the fixed state, the rotation speed of the sun gear Sd (the sixth element) of the fourth planetary gear mechanism PG4 is "0." By setting the third brake B3 to the fixed state, the ring gear Rd (the fourth element) of the fourth planetary gear mechanism PG4 is also "0." Accordingly, the elements Sd, Cd, and Rd of the fourth planetary gear mechanism PG4 are in the locked state in which relative rotation is not possible, and the rotation speed of the first connected structure Cc-Cd-Ra including the carrier Cd (the fifth element) of the fourth planetary gear mechanism PG4 is also "0."

By setting the first clutch C1 to the connected state, the rotation speed of the third connected structure Ca-Cb is "1" which is the same as the rotation speed of the sun gear Sc (the first element) of the third planetary gear mechanism PG3. The rotation speed of the ring gear Rb (the tenth element) of the second planetary gear mechanism PG2 which is connected to the output member 13 is "9th" which is illustrated in FIG. 3 and the ninth gear stage is set up.

When a tenth gear stage is set up, the two-way clutch F1 is set to the reverse rotation prohibited state, the third brake B23 is set to the fixed state, and the first clutch C1 and the second clutch C2 are set to the connected state. By setting the two-way clutch F1 to the reverse rotation prohibited state, forward rotation of the third connected structure Ca-Cb is permitted.

By setting the second clutch C2 to the connected state, the second connected structure Rc-Sb and the sun gear Sd (the sixth element) of the fourth planetary gear mechanism PG4 rotate at the same speed. By setting the third brake B3 to the fixed state, the rotation speed of the ring gear Rd (the fourth element) of the fourth planetary gear mechanism PG4 is "0." By setting the first clutch C1 to the connected state, the rotation speed of the third connected structure Ca-Cb is "1" which is the same as the rotation speed of the sun gear Sc (the first element) of the third planetary gear mechanism PG3. The rotation speed of the ring gear Rb (the tenth element) of the second planetary gear mechanism PG2 which is connected to the output member 13 is "10th" which is illustrated in FIG. 3 and the tenth gear stage is set up.

When a reverse gear stage is set up, the two-way clutch F1 is set to the fixed state (L in FIG. 4), the second brake B2 is set to the fixed state, and the third clutch C3 is set to the connected state. By setting the second brake B2 to the fixed state and setting the third clutch C3 to the connected state, the rotation speed of the first connected structure Cc-Cd-Ra is i/(i+1). By setting the two-way clutch F1 to the fixed state, the rotation speed of the third connected structure Ca-Cb is "0." The rotation speed of the ring gear Rb (the tenth element) of the second planetary gear mechanism PG2 which is connected to the output member 13 is "Rvs" indicating reverse rotation which is illustrated in FIG. 3 and the reverse gear stage is set up.

Speed lines indicated by dotted lines in FIG. 3 represent that the elements of the other planetary gear mechanism rotate (idle) to follow the planetary gear mechanism that transmits power among the four planetary gear mechanisms PG1 to PG4.

Figures 4, 5:
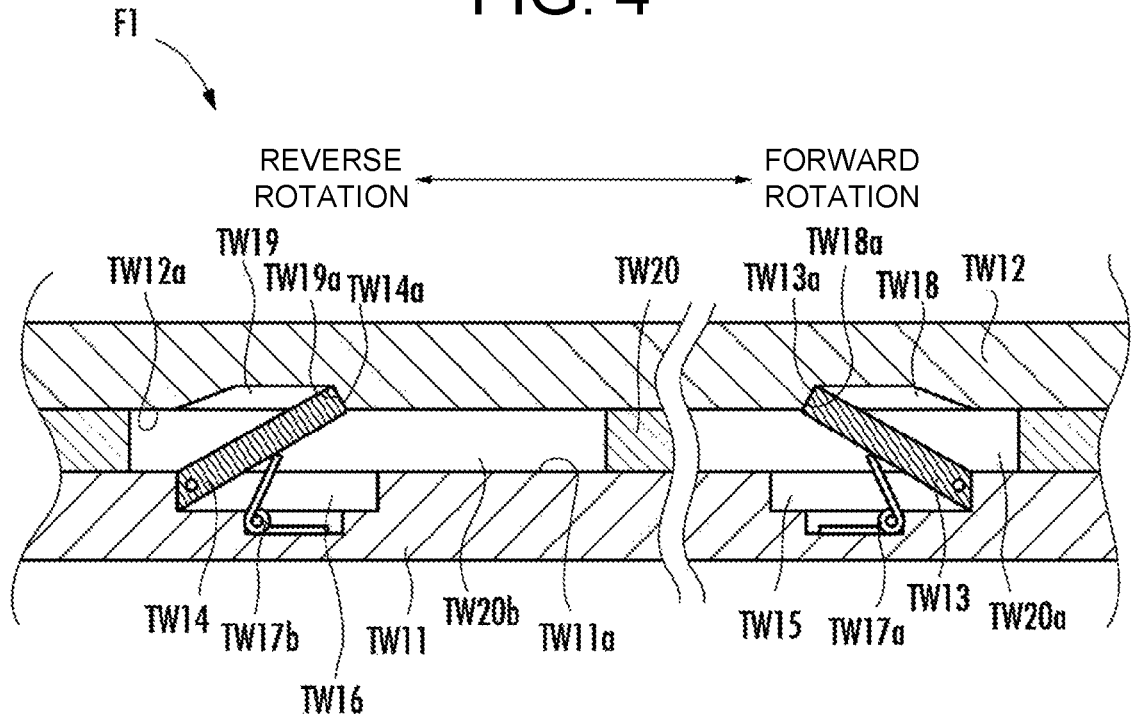
FIG. 4 is a diagram illustrating engagement states of engagement mechanisms in gear shift stages in the embodiment.
FIG. 5 is a sectional view illustrating a fixed state of a two-way clutch which is employed in the embodiment.

FIG. 4 is a diagram collectively illustrating the states of the clutches C1 to C3, the brakes B1 to B3, and the two-way clutch F1 at the above-mentioned gear stages. "0" in columns of three clutches of the first to third clutches C1 to C3 and three brakes of the first to third brakes B1 to B3 represents the connected state or the fixed state, and blanks represent the disconnected state. "R" in the column of the two-way clutch F1 represents the reverse rotation prohibited state, and "L" indicates the fixed state.

Underlined "R" and "L" represent that the rotation speed of the third connected structure Ca-Cb becomes "0" by an operation of the two-way clutch F1. "R/L" represents that it is "R" of the reverse rotation prevented state in a normal state and it is switched to "L" of the fixed state when an engine brake is used.

In FIG. 4, gear shift ratios of the gear stages (the rotation speed of the input shaft 11/the rotation speed of the output member 13) and a common ratio (a ratio of the gear shift ratios between the gear stages, which is a value obtained by dividing the gear shift ratio of a predetermined gear stage by the gear shift ratio of the gear stage immediately higher than the predetermined gear stage) are illustrated where the gear ratio h of the third planetary gear mechanism PG3 is 2.734, the gear ratio i of the fourth planetary gear mechanism PG4 is 1.614, the gear ratio j of the first planetary gear mechanism PG1 is 2.681, and the gear ratio k of the second planetary gear mechanism PG2 is 1.914. It can be seen therefrom that the common ratio can be appropriately set.

The two-way clutch F1 will be described below in detail with reference to FIGS. 5 to 8. The two-way clutch F1 is configured to be switchable between the fixed state in which the third connected structure Ca-Cb is fixed to the transmission case 10 and the reverse rotation prohibited state in which forward rotation of the third connected structure Ca-Cb is permitted and reverse rotation thereof is prohibited.

Figure 6:
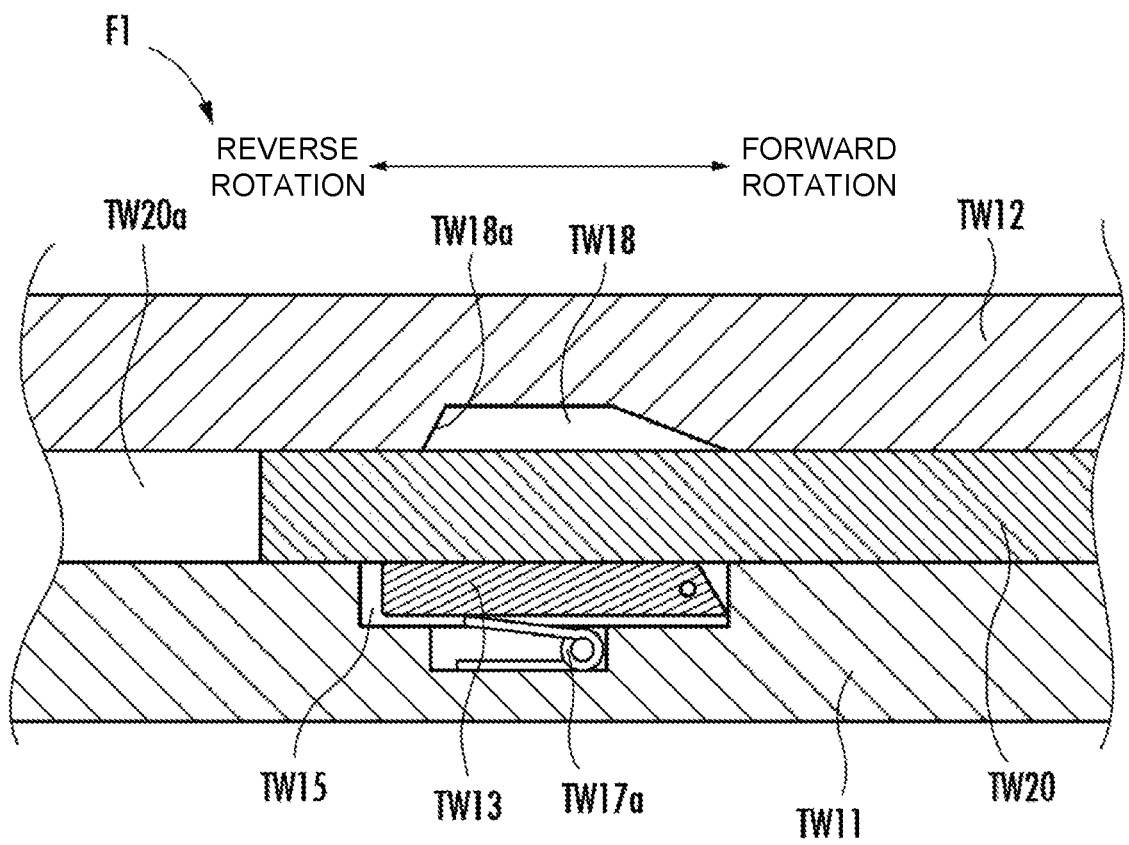
FIG. 6 is a sectional view illustrating a reverse rotation prohibited state of the two-way clutch which is employed in the embodiment.
Figure 7:
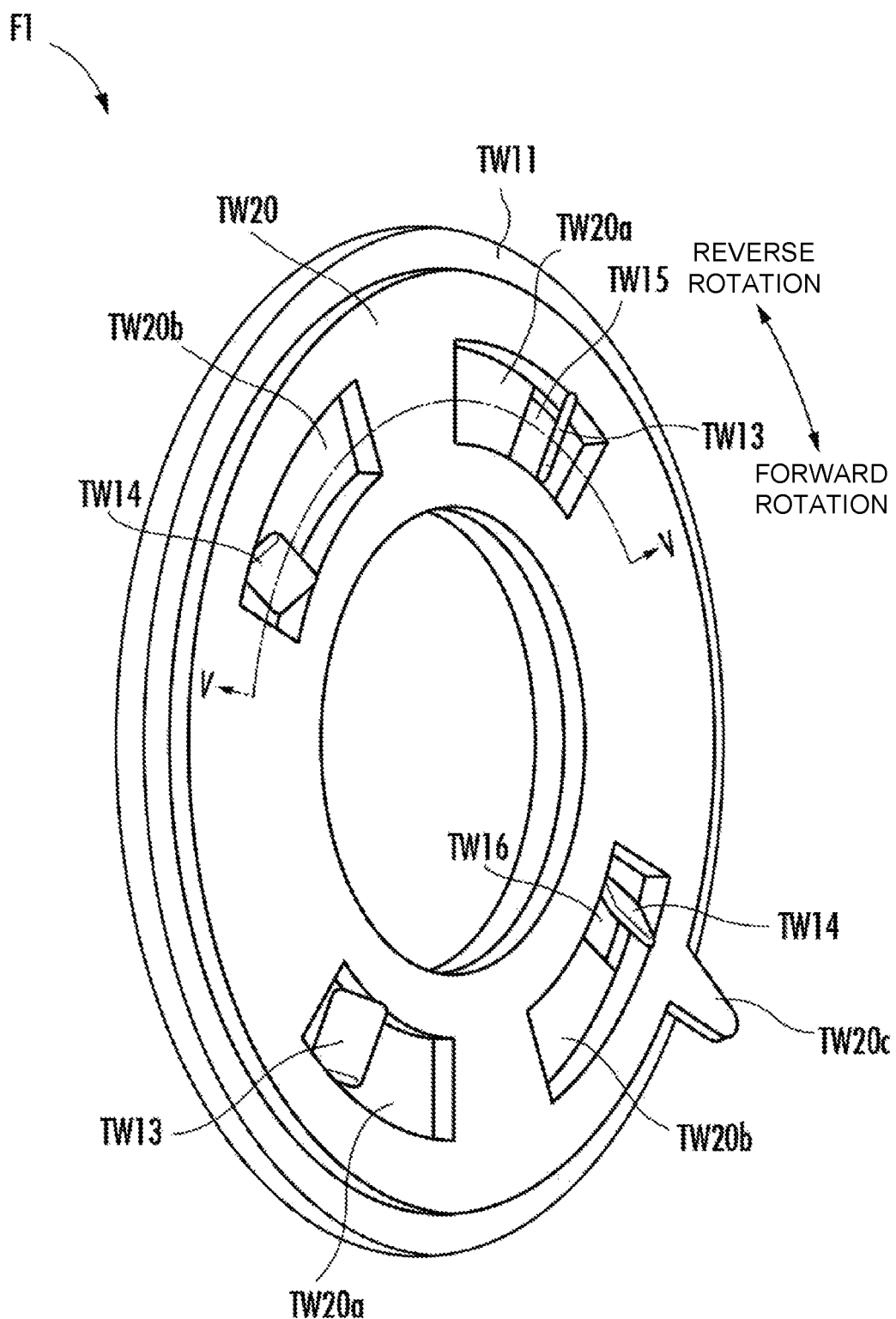
FIG. 7 is a perspective view illustrating the fixed state of the two-way clutch which is employed in the embodiment.

As illustrated as sectional views in FIGS. 5 and 6, the two-way clutch F1 includes a fixed plate TW11 which is fixed to the transmission case 10 and a rotary plate TW12. As illustrated in FIG. 7, the fixed plate TW11 is formed in an annular shape (a doughnut shape). Although not illustrated in FIG. 7, the rotary plate TW12 is also formed in an annular shape (a doughnut shape) similarly to the fixed plate TW11. The fixed plate TW11 and the rotary plate TW12 are arranged concentric with each other.

As illustrated in FIG. 5, a plate-shaped swing portion on a forward rotation prohibition side TW13 in which an end TW13a on the other side in the circumferential direction (the direction in which the rotary plate TW12 rotates reversely) swings about an end of the fixed plate TW11 on one side in the circumferential direction (the direction in which the rotary plate TW12 rotates forward) and a plate-shaped swing portion on a reverse rotation prohibition side TW14 in which an end TW14a on one side in the circumferential direction (the forward rotating direction) swings about an end on the other side in the circumferential direction (the reverse rotating direction) of the fixed plate TW11 are provided in an opposed surface TW11a of the fixed plate TW11 opposing the rotary plate TW12.

Storage portions TW15 and TW16 recessed to store the swing portion on a forward rotation prohibition side TW13 and the swing portion on a reverse rotation prohibition side TW14 are provided on the opposed surface TW11a of the fixed plate TW11. Bias members TW17a and TW17b including springs that bias the swing portions TW13 and TW14 such that the swinging ends TW13a and TW14a of the corresponding swing portions TW13 and TW14 protrude from the storage portions TW15 and TW16 are provided on the bottom surfaces of the storage portions TW15 and TW16.

Pit portions TW18 and TW19 are provided at positions corresponding to the swing portions TW13 and TW14 on an opposed surface TW12a of the rotary plate TW12 opposing the fixed plate TW11. A first engagement portion TW18a that is located on the other side in the circumferential direction (the reverse rotating direction) of the rotary plate TW12 and that is formed in a step shape capable of engaging with the swinging end TW13a of the swing portion on a forward rotation prohibition side TW13 is provided in the first pit portion TW18 which is formed at the position corresponding to the swing portion on a forward rotation prohibition side TW13.

A second engagement portion TW19a that is located on one side in the circumferential direction (the forward rotating direction) of the rotary plate TW12 and that is formed in a step shape capable of engaging with the swinging end TW14a of the swing portion on a reverse rotation prohibition side TW14 is provided in the second pit portion TW19 which is formed at the position corresponding to the swing portion on a reverse rotation prohibition side TW14.

As illustrated in FIGS. 5 and 7, when the end TW13a of the swing portion on a forward rotation prohibition side TW13 and the first engagement portion TW18a can engage with each other and the end TW14a of the swing portion on a reverse rotation prohibition side TW14 and the second engagement portion TW19a can engage with each other, the forward rotation and the reverse rotation of the rotary plate TW12 are prohibited. Accordingly, the state in which the ends TW13a and TW14a and the corresponding engagement portions TW18a and TW149a engage with each other is the fixed state of the two-way clutch F1 in another embodiment.

A switching plate TW20 is interposed between the fixed plate TW11 and the rotary plate TW12. As illustrated in FIG. 7, the switching plate TW20 is also formed in an annular shape (a doughnut shape). In the switching plate TW20, cutout holes TW20a and TW20b are formed at positions corresponding to the swing portions TW13 and TW14.

Figure 8:
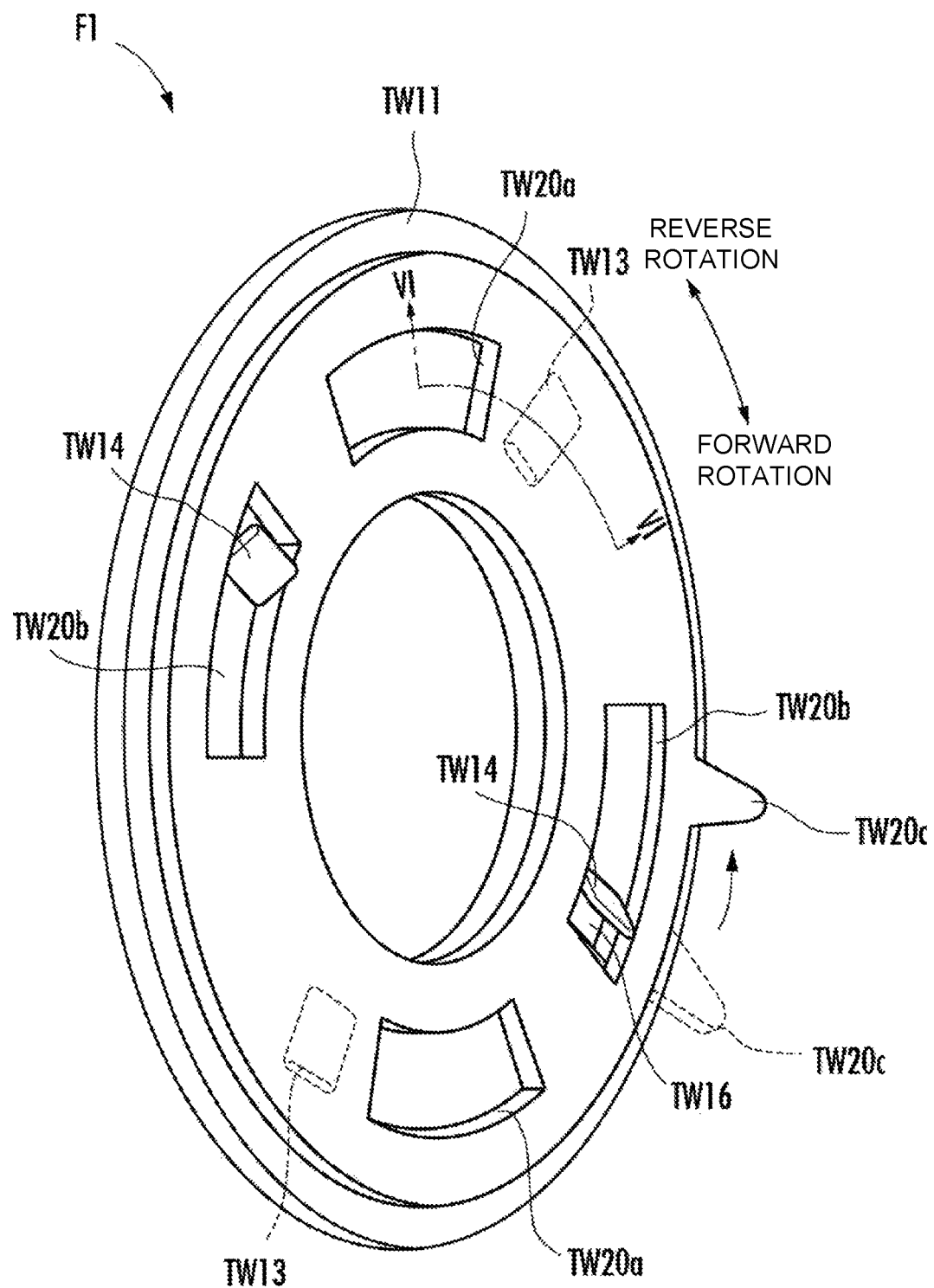
FIG. 8 is a perspective view illustrating the reverse rotation prohibited state of the two-way clutch which is employed in the embodiment.

A protrusion TW20c that protrudes outward in the radial direction is provided in an outer edge of the switching plate TW20. As illustrated in FIG. 8, the switching plate TW20 is configured to swing about the fixed plate TW11.

When the switching plate TW20 swings from the fixed state illustrated in FIG. 7 to the state illustrated in FIG. 8, the first cutout hole TW10a corresponding to the swing portion on a forward rotation prohibition side TW13 goes over the swing portion on a forward rotation prohibition side TW13 and the swing portion on a forward rotation prohibition side TW13 is pushed by the switching plate TW20 and is stored in the storage portion TW15 against a biasing force of the bias member TW17a as illustrated in FIG. 6. Accordingly, engagement of the end TW13a of the swing portion on a forward rotation prohibition side TW13 with the first engagement portion TW18a is prohibited. As a result, forward rotation of the rotary plate TW12 is permitted.

When the switching plate TW20 swings from the fixed state illustrated in FIG. 7 to the state illustrated in FIG. 8, the second cutout hole TW20b corresponding to the swing portion on a reverse rotation prohibition side TW14 is configured such that the swing portion on a reverse rotation prohibition side TW14 is not stored in the storage portion TW16 and the end TW14a engages with the second engagement portion TW19a as illustrated in FIG. 8.

Conclusively, the state illustrated in FIGS. 6 and 8 is the reverse rotation prohibited state of the two-way clutch F1.

A lubricant supply structure in an idling shaft 23 (a rotary shaft) according to the gist of the disclosure will be described below with reference to FIGS. 9 and 10.

Figure 9:
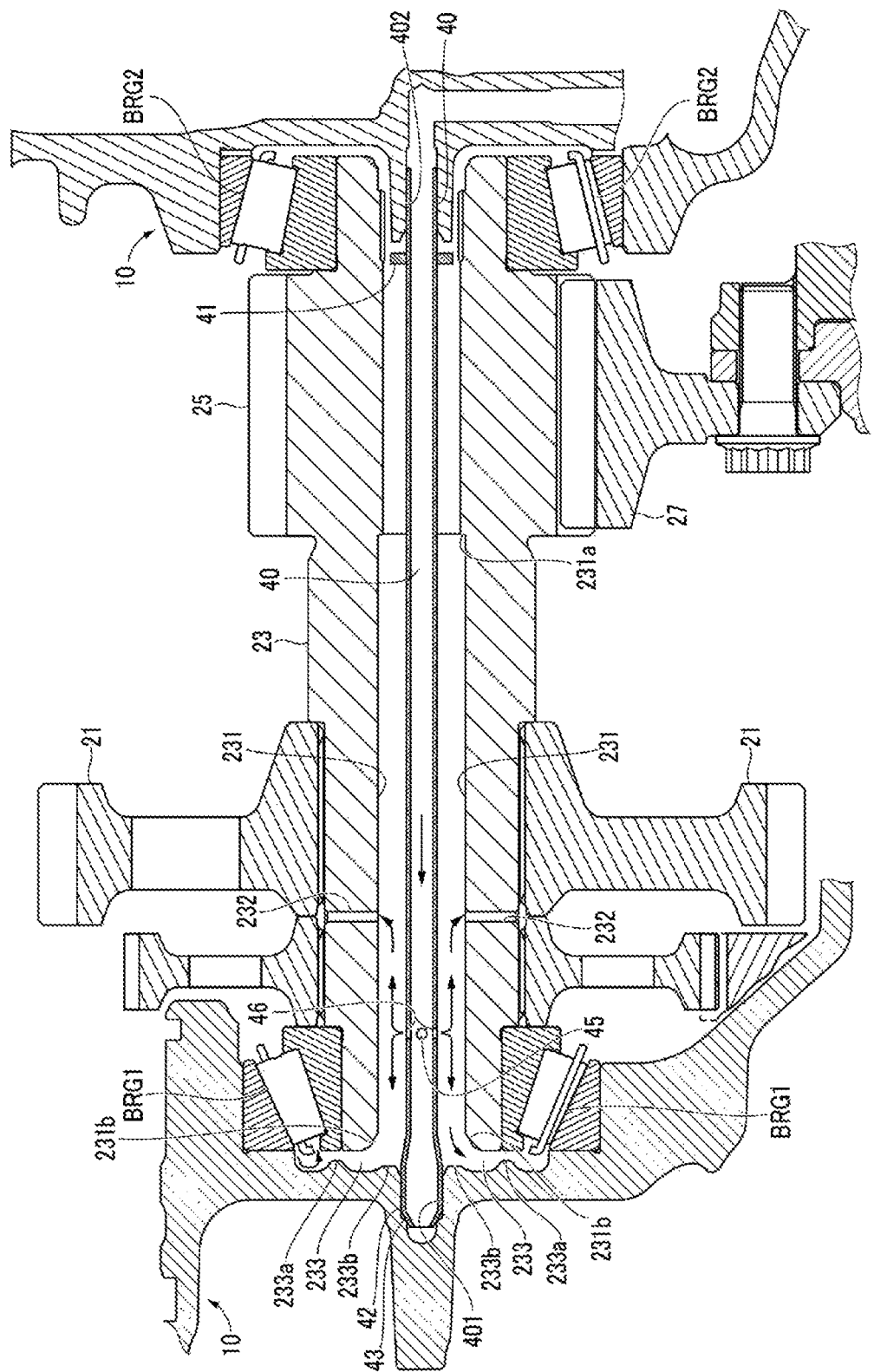
FIG. 9 is a sectional view illustrating principal parts in the embodiment.
Figure 10:
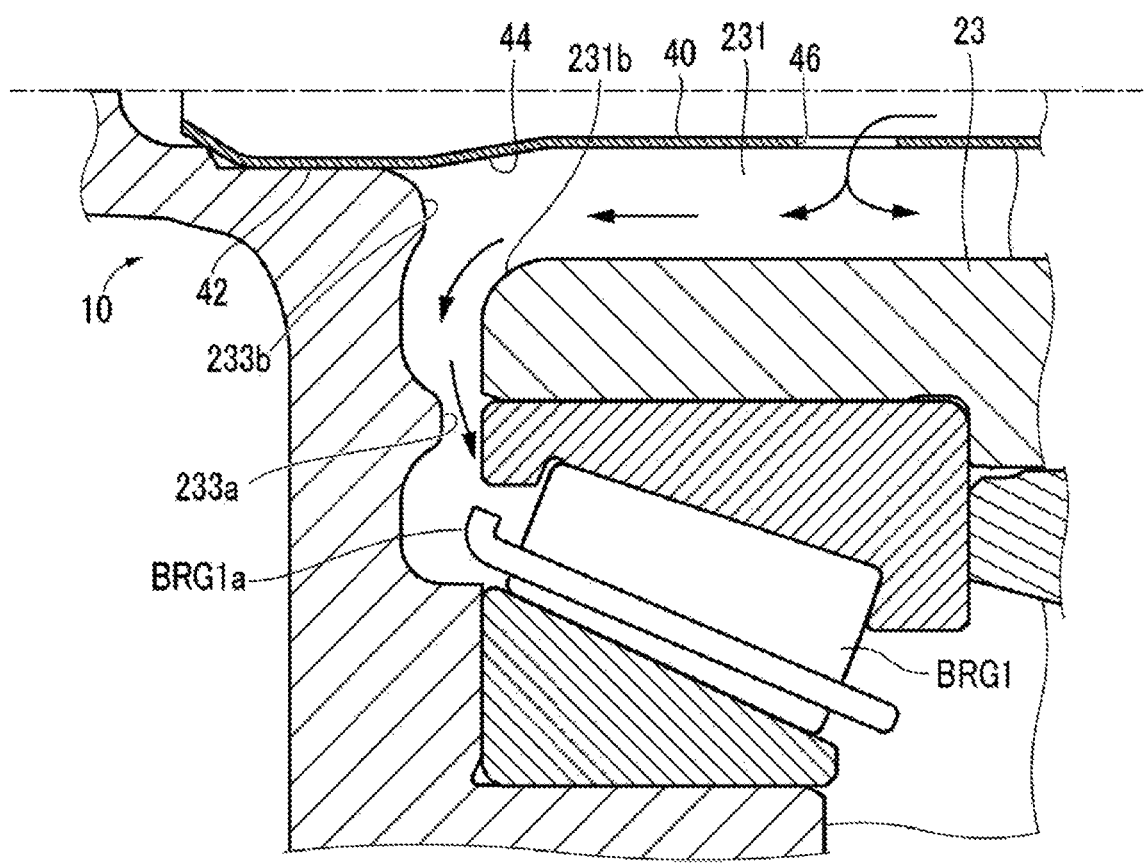
FIG. 10 is an enlarged view illustrating a part of FIG. 9.

As illustrated in FIG. 9, both ends of the idling shaft 23 are rotatably supported by the transmission case 10 via bearings (a first bearing BRG1 and a second bearing BRG2) which are a pair of bearings.

A lubricant passage 231 that extends in an axial direction and discharge holes 232 that communicate with the lubricant passage 231 and that are opened at an attachment position of an idling gear 21 (a part which is spline-fitted) are formed in the idling shaft 23.

A circular discharge space 233 as a discharge channel is formed between an end of the lubricant passage 231 open on a side of the idling shaft 23 supported by the first bearing BRG1 and an inner surface of the transmission case 10. Supply of a lubricant to the first bearing BRG1 is performed via the discharge space 233.

An oil pipe 40 is inserted into the lubricant passage 231 of the idling shaft 23. As illustrated in FIG. 9, the oil pipe 40 includes an annular convex portion 41 that extends from an outer surface on the side of one end (a right end in the drawing) in a flange shape, a large-diameter portion 42 that has a diameter larger than that of the other part on the side of the other end (a left end in the drawing), and a tapered portion 43 that decreases gradually in diameter toward the other end (the left end in the drawing) from the large-diameter portion 42.

The large-diameter portion 42 increases gradually in diameter via an inclined portion 44 from the other end of the oil pipe 40. In order to drop a lubricant in the oil pipe 40 into the lubricant passage 231, a pair of first communication holes 45 and a pair of second communication holes 46 are formed in the oil pipe 40.

As illustrated in FIG. 9, the tapered portion 43 and the large-diameter portion 42 of the oil pipe 40 are inserted into an insertion hole 401 formed on the inner surface of the transmission case 10, and an end opposite to the tapered portion 43 is inserted into an oil introducing portion 402 formed in the transmission case 10. The oil introducing portion 402 is connected to a lubricant source which is not illustrated in the drawing and a lubricant is introduced into the oil pipe 40 from the oil introducing portion 402.

In a state in which the oil pipe 40 is fixed to the transmission case 10, the first communication holes 45 and the second communication holes 46 formed in the oil pipe 40 communicate with the lubricant passage 231 at a position between the discharge hole 232 and the discharge space 233. This position is a position corresponding to the lubricant passage 231 on the insertion hole 401 side.

Accordingly, a lubricant introduced into the oil pipe 40 flows in the oil pipe 40, reaches the first communication holes 45 and the second communication holes 46, and flows out of the first communication holes 45 and the second communication holes 46 to the lubricant passage 231 at a position between the discharge hole 232 and the discharge space 233. The lubricant which is affected by a centrifugal force with the rotation of the idling shaft 23 flows along the inner surface of the lubricant passage 231 and flows to the discharge hole 232 and the discharge space 233.

A stepped portion 231a is formed in the lubricant passage 231 by decreasing the inner diameter of the lubricant passage 231. The lubricant is dammed by the stepped portion 231a, a flow of the lubricant toward the oil introducing portion 402 is restricted, and thus supply of the lubricant to an unnecessary part is prohibited.

A first annular protruding portion 233a that protrudes to a space between the idling shaft 23 and the first bearing BRG1 is formed on the inner surface of the transmission case 10 which forms the discharge space 233. Similarly, a second annular protruding portion 233b that protrudes along the outer circumference of the insertion hole 401 for the oil pipe 40 is formed on the inner surface of the transmission case 10. An inclined guide surface 231b that expands gradually from the inside to the outside of the lubricant passage 231 is formed at an edge of the lubricant passage 231 which is continuous from the discharge space 231.

The supply of a lubricant to the first bearing BRG1 in this embodiment will be described below. As illustrated in FIG. 10, the first bearing BRG1 supports the idling shaft 23 at the outer circumference of an end thereof. Accordingly, the first bearing BRG1 is located inside in the axial direction from the end of the idling shaft 23, and a tip of a retainer BRG1a which is a component of the first bearing BRG1 protrudes slightly outside in the axial direction from the end of the idling shaft 23. Accordingly, there is concern that the supply of a lubricant to the first bearing BRG1 will not be sufficient by only discharging the lubricant two-dimensionally in the radial direction from the edge of the lubricant passage 231.

Therefore, in this embodiment, the first annular protruding portion 233a is provided on the inner surface of the transmission case 10. Accordingly, an inside inclined surface of the first annular protruding portion 233a can guide the lubricant to the tip of the retainer BRG1a of the first bearing BRG1.

By providing the second annular protruding portion 233b on the inner surface of the transmission case 10, the lubricant flowing along the inner surface of the lubricant passage 231 and going straightly to the inner surface of the transmission case 10 is smoothly changed in direction to the radial direction by an outside inclined surface of the second annular protruding portion 233b. Accordingly, the lubricant flowing along the inner surface of the lubricant passage 231 can be smoothly bent to the radial direction and can be caused to flow to the discharge space 233.

By providing the inclined guide surface 231b at the end of the lubricant passage 231, the lubricant flows smoothly to the discharge space 233 along the inclined guide surface 231b due to the centrifugal force of the rotating idling shaft 23.

In this way, since the lubricant which has been guided to the discharge space 233 by the inclined guide surface 231b of the lubricant passage 231 and the second annular protruding portion 233b on the inner surface of the transmission case 10 is guided to the first bearing BRG1 by the first annular protruding portion 233a, a satisfactory amount of lubricant can be sent to the first bearing BRG1 and the first bearing BRG1 can be satisfactorily and efficiently lubricated.

Referring to FIG. 9, when a lubricant is attached to the idling shaft 23 and intrudes into the inside via the space between the first bearing BRG1 and the transmission case 10, the lubricant intruding from the outside is guided to the first bearing BRG1 by the outside inclined surface of the first annular protruding portion 233a on the inner surface of the transmission case 10. Accordingly, the lubricant intruding from the outside can be usefully used for lubrication of the first bearing BRG1, and the lubrication intruding from the outside can also be prevented from intruding into the lubricant passage 231.

In this embodiment, a so-called taper roller bearing is employed as the first bearing BRG1 (a bearing), but the disclosure is not limited thereto. Although not illustrated, a so-called ball bearing may be employed.

In the automatic transmission 3 according to this embodiment, one gear stage (for example, the tenth gear stage) may be omitted to perform forward gear shift of nine gear stages.

In this embodiment, switching of a shift position is performed by manually operating the paddle shift lever 33. However, the method of switching the shift position is not limited thereto, but the shift position may be switched, for example, by pushing a button. In this case, a selected shift position may be determined on the basis of a push signal of the button.

In this embodiment, the two-way clutch F1 is used, but a wet multi-disc brake and a one-way clutch installed in the brake may be provided instead of the two-way clutch F1. In this case, the one-way clutch can be configured to permit forward rotation of the third connected structure Ca-Cb and to prohibit reverse rotation thereof, and the wet multi-disc brake can be engaged only when it is wanted to use an engine brake at the reverse gear stage and the first gear stage.

In this embodiment, the gear shift mechanism (the automatic transmission 3) that can set up each gear stage by engaging three engagement mechanisms is used, but the disclosure can also be applied to a gear shift mechanism that can set up each gear stage by engaging two engagement mechanisms or a gear shift mechanism that can set up each gear stage by engaging four or more engagement mechanisms. In this case, the same advantages can be obtained.

What is claimed is:

1. A power transmission device comprising:
   a rotary shaft that is provided in a housing;
   a lubricant passage that is formed in the rotary shaft and is opened at an end of the rotary shaft;
   a bearing that is provided between an outer circumference of the end of the rotary shaft and the housing and rotatably supports the rotary shaft; and
   a discharge channel that discharges a lubricant in the lubricant passage in a radial direction from the opening at the end of the rotary shaft to supply the lubricant to the bearing,
   wherein the discharge channel includes:
   a first annular protruding portion that is formed on an inner surface of the housing facing an axial direction of the rotary shaft and protrudes between the rotary shaft and the bearing; and
   a second annular protruding portion that is formed on the inner surface of the housing facing the axial direction of the rotary shaft and protrudes to an inner circumferential edge of the opening of the rotary shaft.

2. The power transmission device according to claim 1, wherein the opening of the rotary shaft includes an inclined surface that expands gradually from an inside of the lubricant passage to an outside of the opening.

3. The power transmission device according to claim 1, wherein the opening of the rotary shaft includes an inclined surface that expands gradually from an inside of the lubricant passage to an outside of the opening.

* * * * *